(12) United States Patent
Kiern

(10) Patent No.: US 7,210,194 B2
(45) Date of Patent: May 1, 2007

(54) AIRFLOW SENSOR SYSTEM FOR MONITORING AIR INLET AIRFLOW AND AIR OUTLET AIRFLOW OF A VACUUM CLEANER

(75) Inventor: Bruce M. Kiern, Gulfport, MS (US)

(73) Assignee: Oreck Holdings, LLC, Cheyenne, WY (US)

( * ) Notice: Subject to any disclaimer, the term of this patent is extended or adjusted under 35 U.S.C. 154(b) by 564 days.

(21) Appl. No.: 10/823,181

(22) Filed: Apr. 13, 2004

(65) Prior Publication Data
US 2005/0223515 A1  Oct. 13, 2005

(51) Int. Cl.
A47L 9/28 (2006.01)

(52) U.S. Cl. .......................... 15/339; 15/319; 73/202.5; 73/204.25

(58) Field of Classification Search ................ 15/319, 15/339; 73/202.5, 204.15, 204.16, 204.23, 73/204.25
See application file for complete search history.

(56) References Cited

U.S. PATENT DOCUMENTS

| | | | |
|---|---|---|---|
| 4,294,595 A | 10/1981 | Bowerman | |
| 4,413,514 A * | 11/1983 | Bowman | 73/204.17 |
| 4,437,345 A * | 3/1984 | Egami et al. | 73/204.16 |
| 4,571,991 A * | 2/1986 | Abe et al. | 73/204.16 |
| 4,686,450 A | 8/1987 | Pichat | |
| 4,733,430 A | 3/1988 | Westergren | |
| 5,212,983 A | 5/1993 | Ott et al. | |
| 5,343,590 A | 9/1994 | Radabaugh et al. | |
| 5,668,535 A | 9/1997 | Hendrix et al. | |
| 6,026,539 A | 2/2000 | Mouw et al. | |
| 6,126,681 A | 10/2000 | Van Duren et al. | |
| 6,167,588 B1 | 1/2001 | Dyson | |
| 6,314,807 B1 | 11/2001 | Kawai et al. | |
| 6,447,538 B1 | 9/2002 | Van Duren et al. | |
| 6,467,123 B1 | 10/2002 | Di Nunzio et al. | |
| 6,543,282 B1 | 4/2003 | Thompson | |
| 6,571,422 B1 | 6/2003 | Gordon et al. | |

OTHER PUBLICATIONS

Solid State Airflow Sensor [online], [retrieved on Oct. 14, 2003]. Retrieved from the Warren G-V, A Dielectric Communications Company, website using the Internet <URL: http://www.dielectric.com/warrengv/prod_saf.html>.

* cited by examiner

Primary Examiner—Theresa T. Snider
(74) Attorney, Agent, or Firm—The Ollila Law Group LLC

(57) ABSTRACT

An airflow sensor system for monitoring air inlet airflow and air outlet airflow of a vacuum cleaner is provided according to an embodiment of the invention. The airflow sensor system includes a vacuum cleaner air duct, a bypass tube connected to the air duct, and an airflow sensor positioned at least partially in the bypass tube. The airflow sensor is configured to generate a normal voltage differential range when the bypass tube airflow is within a predetermined normal airflow range, configured to generate an input blockage voltage differential range when the bypass tube airflow is greater than the predetermined normal airflow range, and further configured to generate an output blockage voltage differential range when the bypass tube airflow is less than the predetermined normal airflow range.

18 Claims, 4 Drawing Sheets

AIRFLOW SENSOR SYSTEM FOR MONITORING AIR INLET AIRFLOW AND AIR OUTLET AIRFLOW OF A VACUUM CLEANER

TECHNICAL FIELD

The present invention relates to an airflow sensor system for a vacuum cleaner, and more particularly, to an airflow sensor system for monitoring air inlet airflow and air outlet airflow of a vacuum cleaner.

BACKGROUND OF THE INVENTION

Vacuum cleaners are widely used for picking up dirt and debris. A vacuum cleaner therefore includes a motor and impeller that together generate a vacuum airflow. A filter of some manner removes the dirt and debris from the airflow. The cleaned airflow is subsequently exhausted from the vacuum cleaner.

A common problem in vacuum cleaners is blockage of the vacuum airflow by the dirt and debris entrained in the vacuum airflow. This can occur through blockage at the air inlet or nozzle. The blockage can also occur at a filter. Such a blockage reduces the effectiveness of the vacuum cleaner.

In a clean air type vacuum cleaner, the vacuum cleaner motor and impeller are positioned after the filter or filter bag system, wherein the vacuum airflow is drawn through the filter bag and cleaned before passing through the impeller. In contrast, a dirty air type vacuum cleaner locates the impeller in the vacuum airflow and therefore in the dirt and debris. The dirty vacuum airflow, after passing the impeller, passes through a filter or filter bag system. A prior art dirty airflow sensor system is typically located before a filter bag. Therefore, in a prior art dirty air vacuum system, it is difficult to monitor exhaust air due to the debris and air mix. Typical prior art sensors are easily clogged by the dirt in the dirty air stream.

In the prior art, the vacuum airflow of a vacuum cleaner has been typically monitored by a mechanical switch or device or by a pressure sensor. In the prior art, only the vacuum cleaner air outlet/exhaust has been typically monitored for blockage.

SUMMARY OF THE INVENTION

An airflow sensor system for monitoring air inlet airflow and air outlet airflow of a vacuum cleaner is provided according to an embodiment of the invention. The airflow sensor system comprises a vacuum cleaner air duct including an air inlet and an air outlet. The air duct conducts a vacuum airflow generated by the vacuum cleaner. The airflow sensor system further comprises a bypass tube including a first end connected to the air duct between the air inlet and the air outlet and with the bypass tube including a second end communicating with an external air. The bypass tube conducts a bypass tube airflow. The airflow sensor system further comprises an airflow sensor positioned at least partially in the bypass tube. The airflow sensor is configured to generate a normal voltage differential range when the bypass tube airflow is within a predetermined normal airflow range, configured to generate an input blockage voltage differential range when the bypass tube airflow is greater than the predetermined normal airflow range, and further configured to generate an output blockage voltage differential range when the bypass tube airflow is less than the predetermined normal airflow range.

An airflow sensor system for monitoring air inlet airflow and air outlet airflow of a vacuum cleaner is provided according to an embodiment of the invention. The airflow sensor system comprises a vacuum cleaner air duct including an air inlet and an air outlet. The air duct conducts a vacuum airflow generated by the vacuum cleaner. The airflow sensor system further comprises an airflow sensor positioned at least partially in the vacuum airflow. The airflow sensor comprises a first temperature-dependent element connected to a first voltage node and also connected to a first bridge node. The first temperature-dependent element is positioned in at least a portion of the vacuum airflow. The airflow sensor further comprises a first bridge resistor connected to the first bridge node and also connected to a second voltage node. The airflow sensor further comprises a second temperature-dependent element connected to the first voltage node and also connected to a second bridge node. The second temperature-dependent element is positioned outside the vacuum airflow and positioned in ambient air. The airflow sensor further comprises a second bridge resistor connected to the second bridge node and also connected to the second voltage node. The airflow sensor further comprises a heater element in close proximity with the first temperature-dependent element. The heater element heats the first temperature-dependent element substantially as a function of a voltage differential across the first bridge node and the second bridge node. The airflow sensor is configured to generate a normal voltage differential range when the vacuum airflow is within a predetermined normal airflow range, configured to generate an input blockage voltage differential range when the vacuum airflow is greater than the predetermined normal airflow range, and further configured to generate an output voltage differential range when the vacuum airflow is less than the predetermined normal airflow range.

BRIEF DESCRIPTION OF THE DRAWINGS

The same reference number represents the same element on all drawings. It should be noted that the drawings are not to scale.

DETAILED DESCRIPTION OF THE INVENTION

Figure 1:
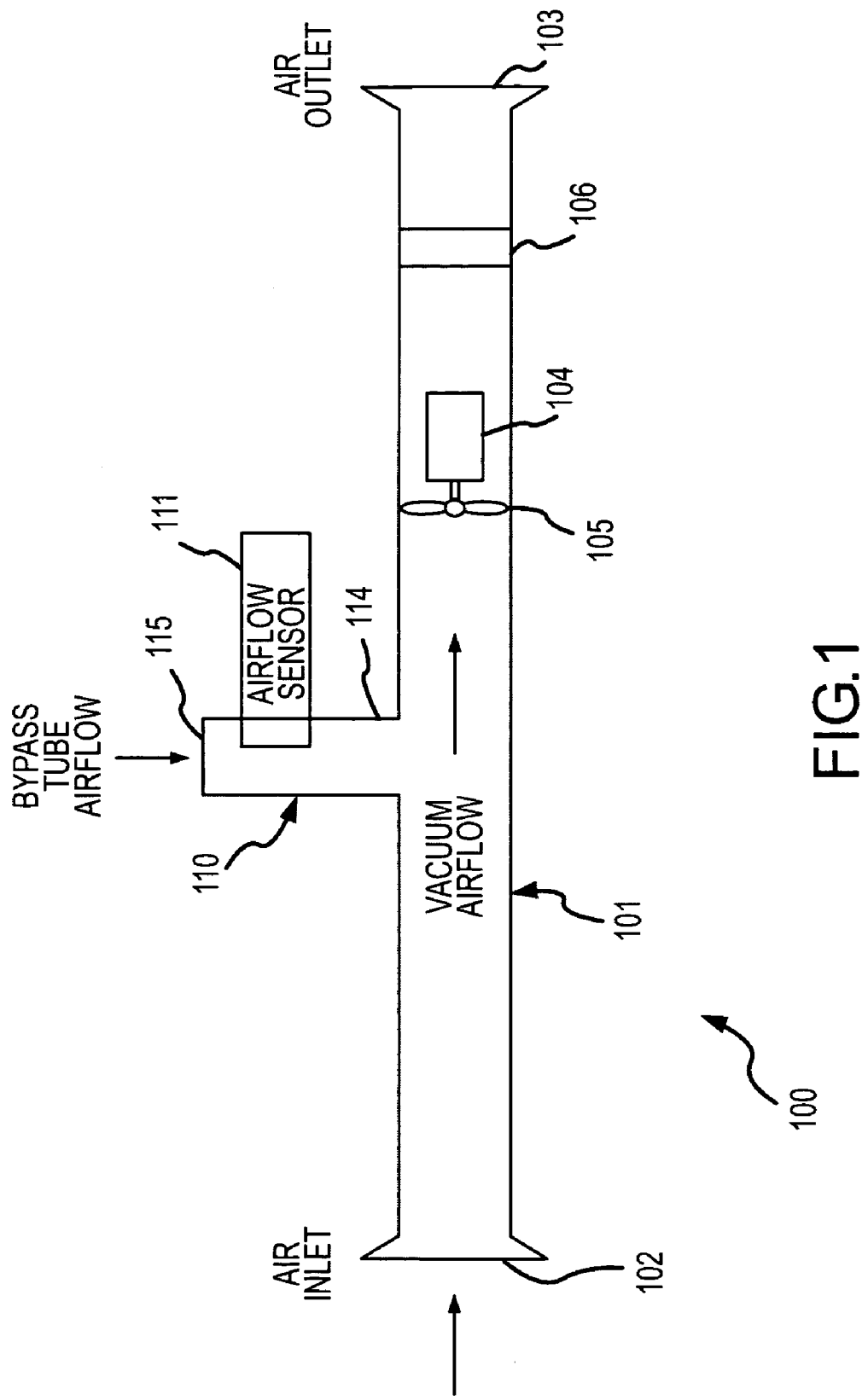
FIG. 1 shows an airflow sensor system for monitoring air inlet airflow and air outlet airflow of a vacuum cleaner according to an embodiment of the invention.

FIG. 1 shows an airflow sensor system 100 for monitoring air inlet airflow and air outlet airflow of a vacuum cleaner according to an embodiment of the invention. The airflow sensor system 100 includes an air duct 101, a bypass tube 110, and an airflow sensor 111. The airflow sensor 111 in one embodiment extends at least partially into the bypass tube 110. Alternatively, the airflow sensor 111 can extend at least partially into the air duct 101. The airflow sensor 111 determines whether the vacuum airflow in the air duct 101 is within a predetermined normal airflow range, and can generate alerts if the vacuum airflow is being affected by an air inlet blockage or an air outlet blockage. In one embodiment, the airflow sensor 111 indirectly accomplishes this by monitoring bypass tube airflow. Alternatively, the airflow sensor 111 can directly measure the vacuum airflow in the air duct 101.

The air duct 101 includes an air inlet 102 and an air outlet 103. The air duct 101 further includes a motor 104 and impeller 105 that together generate the vacuum airflow in the air duct 101. The air duct 101 further includes a filter element 106 (i.e., a filter or filter bag 106) that removes dirt and debris from the vacuum airflow. In the embodiment shown, the vacuum cleaner is a dirty air vacuum cleaner, wherein the dirty vacuum airflow passes through the impeller 105 before passing through the filter or filter bag 106. The filter element 106 in a dirty air vacuum cleaner therefore comprises the air outlet 103. Alternatively, in a clean air vacuum cleaner embodiment, the filter element 106 is positioned before the impeller 105, and the vacuum airflow is cleaned before it reaches the impeller 105.

The bypass tube 110 includes a first end 114 connected to the air duct 101 between the air inlet 102 and the air outlet 103. In a dirty air vacuum cleaner embodiment, the first end 114 of the bypass tube 110 is connected to the air duct 101 between the air inlet 102 and the filter element 106 positioned in the air duct 101. The bypass tube 110 includes a second end 115 communicating with ambient air, such as air external to the vacuum cleaner. The purpose of the bypass tube 110 is to enable the airflow sensor 111 to detect both air inlet blockages and air outlet blockages. The bypass tube 110 is typically much smaller in cross-section than the air duct 101, and therefore only a small volume of air is conducted into the air duct 101 by the bypass tube 110. The bypass tube 110 therefore does not significantly reduce air drawn into the air inlet 102 through a vacuum cleaner nozzle or vacuum cleaner port.

During normal, unblocked or unrestricted operation, the vacuum airflow in the air duct 101 falls within a normal airflow range. As a result, only a small airflow passes through the bypass tube 110 and into the vacuum airflow.

When the air inlet 102 becomes blocked or unacceptably restricted, such as by an accumulation of dirt or debris, more air is pulled through the bypass tube 110 by the motor 104 and impeller 105. Consequently, when the air inlet 102 is blocked or unacceptably restricted, the bypass tube airflow increases. When the bypass tube airflow is greater than the normal airflow range, the air inlet 102 can be determined to be blocked, and an appropriate air inlet blockage indicator can be activated. The activation of the air inlet blockage indicator can include illuminating an air inlet blockage indicator light or activating some other manner of mechanical or visual indicator, for example. In addition, other actions can be taken, such as disabling the motor 104, etc.

When the blockage or restriction is in the air outlet 103 or filter element 106, the vacuum airflow is reduced or stopped. As a result, the bypass tube airflow is also reduced or stopped. Therefore, in the event of an outlet blockage or restriction, such as in the case of a very dirty filter element 106, the bypass tube airflow will be less than the predetermined normal airflow range. When the bypass tube airflow is less than the normal airflow range, the air outlet 103 of the filter element 106 can be determined to be blocked, and an appropriate air outlet blockage indicator can be activated. The activation of the air outlet blockage indicator can include illuminating an air outlet blockage indicator light or activating some other manner of mechanical or visual indicator, for example. In addition, other actions can be taken, such as disabling the motor 104, etc.

Figure 2:
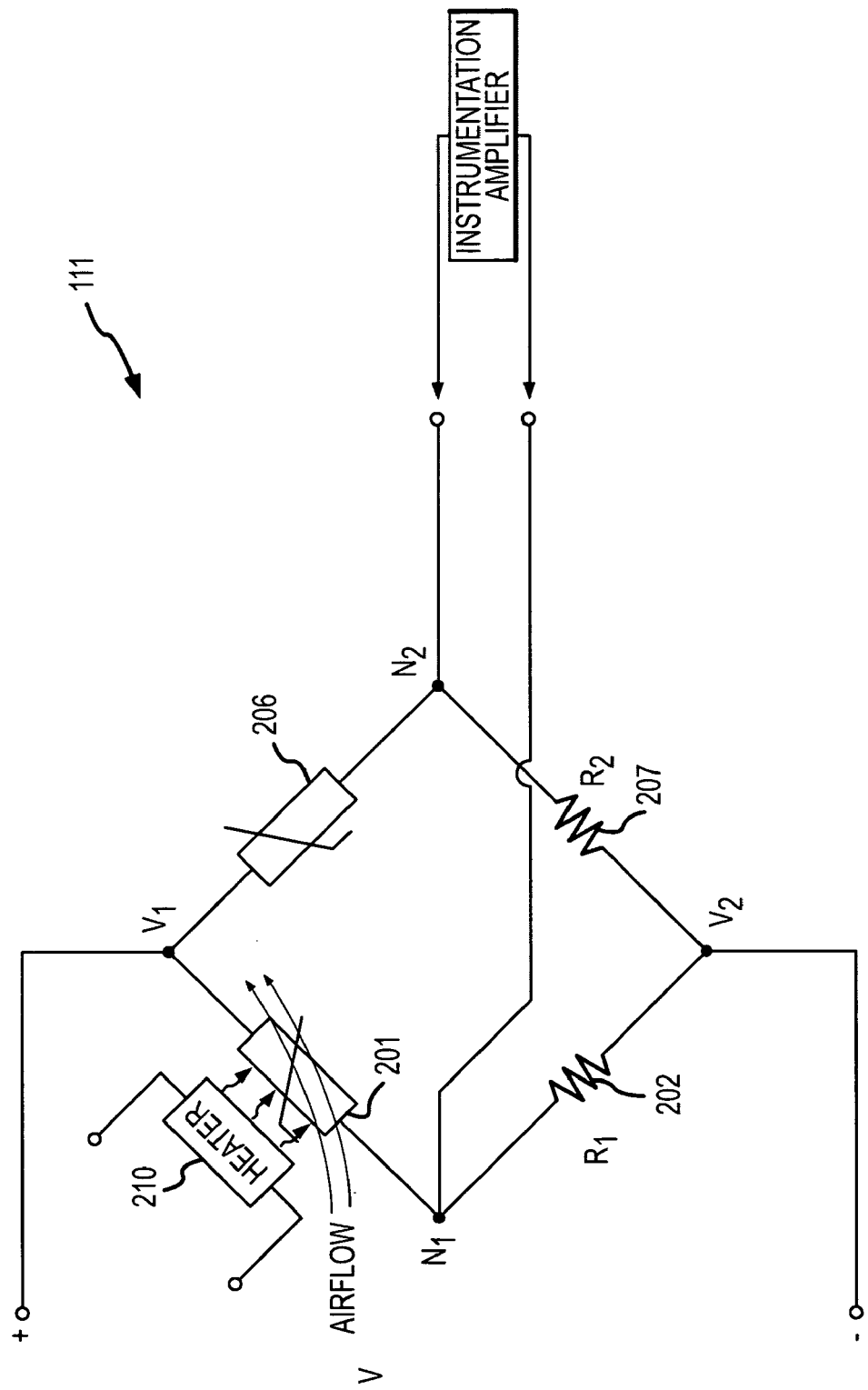
FIG. 2 is a schematic diagram of an airflow sensor according to an embodiment of the invention.

FIG. 2 is a schematic diagram of an airflow sensor 111 according to an embodiment of the invention. The airflow sensor 111 includes a first temperature-dependent element 201, a first bridge resistor $R_1$ 202, a second temperature-dependent element 206, a second bridge resistor $R_2$ 207, and a heater element 210. In one embodiment, the first and second temperature-dependent elements 201 and 206 are resistor temperature dependent elements. Resistor temperature dependent elements advantageously offer a varying resistance over a relatively small range of temperature. Therefore, a resistor temperature dependent element can be used to track small changes in temperature. However, other temperature-dependent elements can be employed in the airflow sensor 111. For example, the temperature-dependent elements can alternatively comprise thermistors. It should be understood that in one embodiment the airflow sensor 111 of FIG. 1 comprises the bridge device of FIG. 2.

The first temperature-dependent element 201 is connected to a first voltage node $V_1$ and is connected to a first bridge node $N_1$. The second temperature-dependent element 206 is connected to the first voltage node $V_1$ and is connected to a second bridge node $N_2$. The first bridge resistor $R_1$ 202 is connected to the first bridge node $N_1$, and is connected to a second voltage node $V_2$. The second bridge resistor $R_2$ 207 is connected to the second bridge node $N_2$ and is connected to the second voltage node $V_2$. In one embodiment, the heater element 210 is in close proximity with the first temperature-dependent element 201 and radiatively heats the first temperature-dependent element 201. Alternatively, in another embodiment the heater element 210 is in partial or substantial contact with the first temperature-dependent element 201 and conductively and radiatively heats the first temperature-dependent element 201. For example, the heater element 210 can be located below the first temperature-dependent element 201 and the first temperature-dependent element 201 can substantially rest on the heater element 210. In this manner, an optimal heat transfer to the first temperature-dependent element 201 is obtained.

In one embodiment, the heater element 210 is indirectly connected across the first bridge node $N_1$ and the second bridge node $N_2$, through an instrumentation amplifier (shown) or other interface. Consequently, the heater element 210 receives a regulated or unregulated voltage that varies substantially as a function of the voltage across the first bridge node $N_1$ and the second bridge node $N_2$ and heats the first temperature-dependent element 201 substantially as a function of a voltage differential across the first bridge node $N_1$ and the second bridge node $N_2$. Alternatively, in a lesser preferred embodiment, the heater element 210 can be connected directly across the first bridge node $N_1$ and the second bridge node $N_2$ (not shown).

In one embodiment, the first voltage node $V_1$ comprises a positive node connected to a DC power source and the second voltage node $V_2$ comprises a negative or ground node of the DC power source. However, it should be understood that the first and second nodes $V_1$ and $V_2$ can be connected in other ways and to various polarities and voltage levels.

The airflow sensor 111 in one embodiment is configured as a bridge that can generate a voltage differential across the first and second bridge nodes $N_1$, and $N_2$. The airflow sensor bridge 111 is configured to generate a normal voltage differential range for a vacuum airflow within a predetermined normal airflow range, configured to generate an input blockage voltage differential range when the vacuum airflow is greater than the predetermined normal airflow range, and further configured to generate an output blockage voltage differential range when the vacuum airflow is less than the predetermined normal airflow range. Input and output blockage indicator circuitry can be connected to the bridge nodes $N_1$, and $N_2$, and can be activated when the voltage differential across the bridge nodes $N_1$, and $N_2$ exceeds predetermined thresholds.

The first temperature-dependent element 201 is positioned at least partially in an airflow. In one embodiment, the airflow sensor 111 is positioned at least partially in the air duct 101 and in the vacuum airflow. In another embodiment, the airflow sensor 111 is positioned at least partially in the bypass tube 110, wherein the first temperature-dependent element 201 is at least partially in the vacuum airflow to the extent it is positioned in the bypass tube airflow. The first temperature-dependent element 201 is cooled by the airflow, and the temperature of the first temperature-dependent element 201 is therefore a function of the airflow. The electrical resistance of the first temperature-dependent element 201 in one embodiment will increase with an increase in temperature. As a result, the electrical current through the first temperature-dependent element 201 (and therefore the voltage at the first bridge node $N_1$ and across the first bridge resistor $R_1$ 202) will be related to the airflow over the first temperature-dependent element 201.

The second temperature-dependent element 206 is positioned outside the vacuum airflow and is positioned in ambient air. The only cooling of the second temperature-dependent element 206 is done by the ambient air, and as a result the temperature of the second temperature-dependent element 206 is substantially constant. The purpose of the second temperature-dependent element 206 is to provide temperature compensation due to variations in the ambient temperature.

Figure 3:
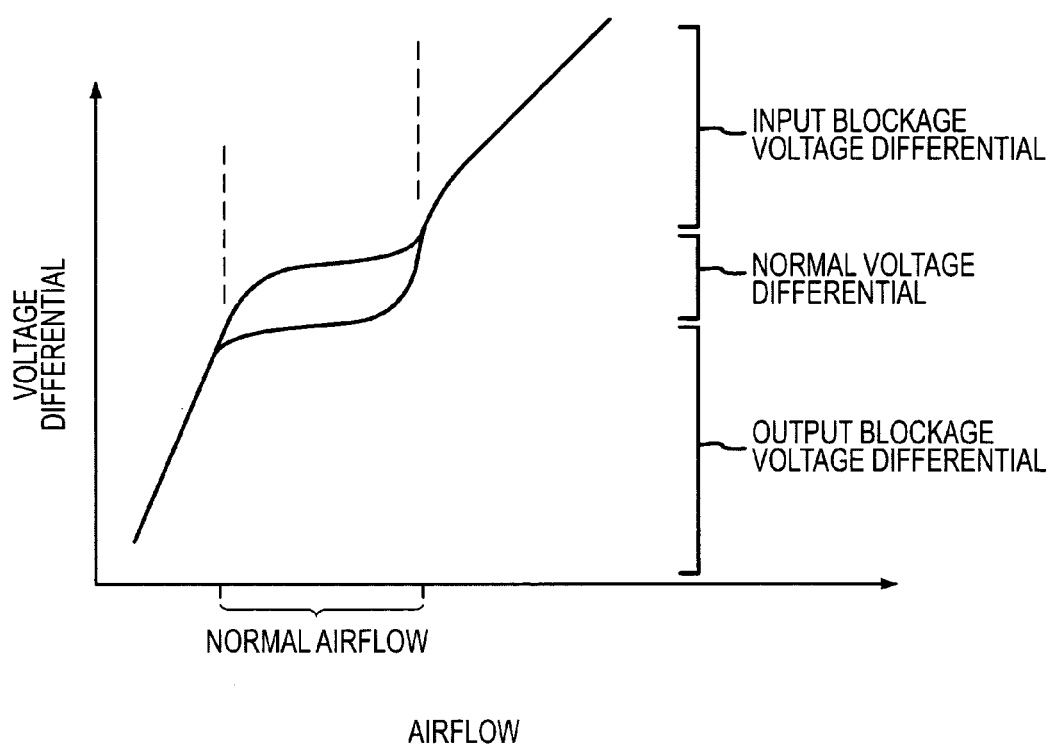
FIG. 3 is a graph of airflow versus voltage differential of the airflow sensor according to an embodiment of the invention.

FIG. 3 is a graph of airflow versus voltage differential of the airflow sensor 111 according to an embodiment of the invention. The graph is an example of a voltage differential across the bridge nodes $N_1$ and $N_2$ for a typical airflow range.

When the airflow is within the normal airflow range, the voltage differential is substantially constant, as depicted by the substantially horizontal portion of the graph. The voltage differential can vary somewhat with airflow, as the first bridge node voltage will change with airflow, while the voltage at the second bridge node $N_2$ remains substantially constant. The voltage at the second bridge node $N_2$ typically varies only with ambient temperature, and has a minimal effect on airflow measurement.

In one embodiment, the voltage differential is substantially zero for the normal airflow range. In such an embodiment, the heater element 210 balances the first bridge node voltage with respect to the second bridge node voltage. When the voltage differential moves above or below a zero value due to changes in the airflow, more or less electrical power is available to the heating element 210. Because the heater element 210 can consume excess electrical power, the heating provided to the first temperature-dependent element 201 will likewise change. As a result, the voltage differential will remain substantially constant (and substantially zero in this embodiment). Consequently, unless there is a very large or very small amount of cooling airflow, the heater element 210 can and will balance the voltages at the first bridge node $N_1$, and the second bridge node $N_2$.

When the airflow over the airflow sensor 111 is high, the first temperature-dependent element 201 is highly cooled. This cooling will result in more current passing through the first temperature-dependent element 201, and a higher voltage at the first bridge node $N_1$, (i.e., the voltage differential falls in the input blockage voltage differential range of the figure). Likewise, when the airflow is below the normal airflow range, the voltage differential will be below the normal voltage differential range (i.e., the voltage differential falls in the output blockage voltage differential range). As can be seen from the figure, hysteresis between the low, normal, and high airflow conditions can be configured into the airflow sensor 111.

It should be understood that the voltage differential across the bridge nodes $N_1$ and $N_2$ is given as an example. The voltage differential can be reversed and the slope of portions of voltage differential response can be changed by placement and characteristics of the various components.

Figure 4:
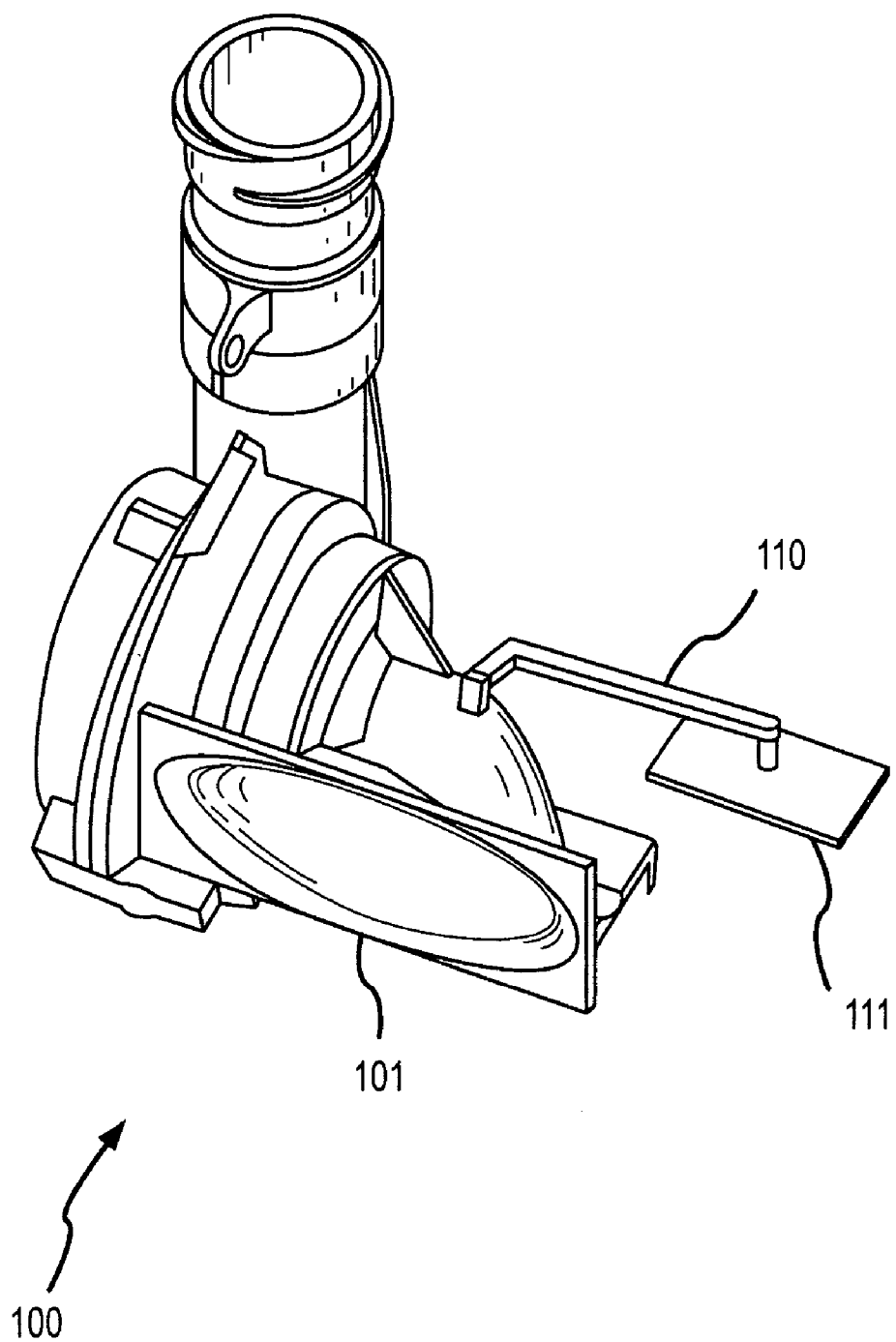
FIG. 4 is a diagram of the airflow sensor system 100 according to an embodiment of the invention.

FIG. 4 is a diagram of the airflow sensor system 100 according to an embodiment of the invention. In this embodiment, the airflow sensor 111 is formed on a circuit board, and the bypass tube 110 connects the airflow sensor 111 to the air duct 101. Consequently, the airflow sensor 111 is connected to the second end 115 of the bypass tube 110. It can be seen from the figure that the air duct 101 can comprise a portion of the complete air channel of the vacuum cleaner.

The airflow sensor system 100 and the airflow sensor 111 according the invention can be implemented according to any of the embodiments in order to obtain several advantages, if desired. The airflow sensor system 100 and the airflow sensor 111 provide detection of blockage or restriction in both the air inlet 102 and the air outlet 103. The airflow sensor system 100 and the airflow sensor 111 provide an accurate electronic airflow measurement. The airflow sensor system 100 and the airflow sensor 111 can be employed in any type of vacuum cleaner, including upright, canister, wet/dry and shop vacuum cleaners, etc.

What is claimed is:

1. An airflow sensor system adapted for monitoring air inlet airflow and air outlet airflow of a vacuum cleaner, comprising:
    a vacuum cleaner air duct including an air inlet and an air outlet, wherein the air duct conducts a vacuum airflow generated by the vacuum cleaner;
    a bypass tube including a first end connected to the air duct between the air inlet and the air outlet and with the bypass tube including a second end communicating with an external air, wherein the bypass tube conducts a bypass tube airflow; and
    an airflow sensor positioned at least partially in the bypass tube, wherein the airflow sensor is configured to generate a normal voltage differential range when the bypass tube airflow is within a predetermined normal airflow range, configured to generate an input blockage voltage differential range when the bypass tube airflow is greater than the predetermined normal airflow range, and further configured to generate an output blockage voltage differential range when the bypass tube airflow is less than the predetermined normal airflow range.

2. The system of claim 1, wherein the first end of the bypass tube is connected to the air duct between the air inlet and a filter element positioned in the air duct.

3. The system of claim 1, wherein hysteresis exists between the input blockage voltage differential range and the normal voltage differential range.

4. The system of claim 1, wherein hysteresis exists between the normal voltage differential range and the output blockage voltage differential range.

5. The system of claim 1, with the airflow sensor system further comprising an air inlet blockage indicator that is activated when the bypass tube airflow is greater than the predetermined normal airflow range.

6. The system of claim 1, with the airflow sensor system further comprising an air outlet blockage indicator that is activated when the bypass tube airflow is less than the predetermined normal airflow range.

7. The system of claim 1, with the airflow sensor comprising a first temperature-dependent element positioned in the bypass tube and a second temperature-dependent element positioned in ambient air away from said air duct and away from said bypass tube.

8. The system of claim 7, wherein the first and second temperature-dependent elements comprise resistor temperature dependent elements.

9. The system of claim 1, with the airflow sensor comprising:
a first temperature-dependent element connected to a first voltage node and also connected to a first bridge node, with the first temperature-dependent element being positioned in the bypass tube;
a first bridge resistor connected to the first bridge node and also connected to a second voltage node;
a second temperature-dependent element connected to the first voltage node and also connected to a second bridge node, with the second temperature-dependent element being positioned outside the bypass tube and positioned in ambient air;
a second bridge resistor connected to the second bridge node and also connected to the second voltage node; and
a heater element in substantial contact with the first temperature-dependent element, wherein the heater element heats the first temperature-dependent element substantially as a function of a voltage differential across the first bridge node and the second bridge node.

10. The system of claim 9, wherein the first and second temperature-dependent elements comprise resistor temperature dependent elements.

11. An airflow sensor system adapted for monitoring air inlet airflow and air outlet airflow of a vacuum cleaner, comprising:
a vacuum cleaner air duct including an air inlet and an air outlet, wherein the air duct conducts a vacuum airflow generated by the vacuum cleaner; and
an airflow sensor positioned at least partially in the vacuum airflow, with the airflow sensor comprising:
a first temperature-dependent element connected to a first voltage node and also connected to a first bridge node, with the first temperature-dependent element being positioned in at least a portion of the vacuum airflow;
a first bridge resistor connected to the first bridge node and also connected to a second voltage node;
a second temperature-dependent element connected to the first voltage node and also connected to a second bridge node, with the second temperature-dependent element being positioned outside the vacuum airflow and positioned in ambient air;
a second bridge resistor connected to the second bridge node and also connected to the second voltage node; and
a heater element in close proximity with the first temperature-dependent element, wherein the heater element heats the first temperature-dependent element substantially as a function of a voltage differential across the first bridge node and the second bridge node;
wherein the airflow sensor is configured to generate a normal voltage differential range when the vacuum airflow is within a predetermined normal airflow range, configured to generate an input blockage voltage differential range when the vacuum airflow is greater than the predetermined normal airflow range, and further configured to generate an output voltage differential range when the vacuum airflow is less than the predetermined normal airflow range.

12. The system of claim 11, wherein hysteresis exists between the input blockage voltage differential range and the normal voltage differential range.

13. The system of claim 11, wherein hysteresis exists between the normal voltage differential range and the output blockage voltage differential range.

14. The system of claim 11, wherein the first and second temperature-dependent elements comprise resistor temperature dependent elements.

15. The system of claim 11, further comprising a bypass tube including a first end connected to the air duct between the air inlet and the air outlet and with the bypass tube including a second end communicating with the ambient air, wherein the airflow sensor is positioned at least partially in the bypass tube.

16. The system of claim 15, with the airflow sensor system further comprising an air inlet blockage indicator that is activated when the bypass tube airflow is greater than the predetermined normal airflow range.

17. The system of claim 15, with the airflow sensor system further comprising an air outlet blockage indicator that is activated when the bypass tube airflow is less than the predetermined normal airflow range.

18. The system of claim 11, further comprising a bypass tube including a first end connected to the air duct between the air inlet and a filter element positioned in the air duct and with the bypass tube including a second end communicating with the ambient air, wherein the airflow sensor is positioned at least partially in the bypass tube.

* * * * *